United States Patent [19]

Dyllick-Brenzinger et al.

[11] Patent Number: 4,717,423

[45] Date of Patent: Jan. 5, 1988

[54] MIXTURES OF DYE PRECURSORS, AND PRESSURE-SENSITIVE RECORDING MATERIAL CONTAINING THESE MIXTURES

[75] Inventors: Rainer Dyllick-Brenzinger, Weinheim; Udo Mayer, Frankenthal; Andreas Oberlinner, Ludwigshafen, all of Fed. Rep. of Germany

[73] Assignee: BASF Aktiengesellschaft, Ludwigshafen, Fed. Rep. of Germany

[21] Appl. No.: 833,280

[22] Filed: Feb. 27, 1986

[30] Foreign Application Priority Data

Mar. 1, 1985 [DE] Fed. Rep. of Germany ....... 3507173

[51] Int. Cl.[4] .............................................. C09D 11/00

[52] U.S. Cl. ...................................... 106/21; 427/150; 427/151

[58] Field of Search .......................... 106/21; 346/221; 427/150, 151

[56] References Cited

U.S. PATENT DOCUMENTS 3,525,630 8/1970 Phillips .

FOREIGN PATENT DOCUMENTS 2151113 4/1972 Fed. Rep. of Germany .
852131 10/1960 United Kingdom .

OTHER PUBLICATIONS

Chemical Abstract No. CA79(14):80343h, German Patent No. DE 2264033, Jul. 5, 1973.

Abrahart, "Stabilised leuco dyes as colour formers", *Chemistry and Industry*, Jun. 16, 1973, p. 583.

Kondo et al., "Phthalide color formers", *Chemical Abstracts*, vol. 84, No. 4, Jan. 1976, p. 116.

Miki et al., "Pressure-sensitive copying paper", *Chemical Abstracts*, vol. 80, No. 10, Mar. 11, 1974, p. 410.

*Primary Examiner*—Amelia Burgess Yarbrough
*Attorney, Agent, or Firm*—Oblon, Fisher, Spivak, McClelland, & Maier

[57] ABSTRACT

Mixtures of dye precursors which contain (a) the lactone of 2-carboxy-4,4'-bisdimethylaminobenzhydrol (I) and (b) crystal violet lactone and/or one or more fluoran lactones of the formula (II)

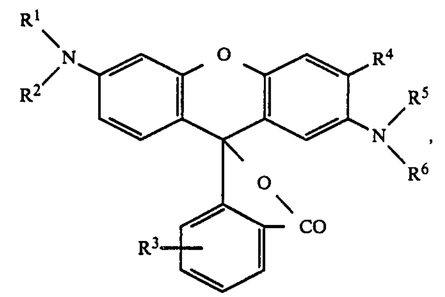

where $R^1$ is alkyl, $R^2$ is alkyl, phenalkyl, unsubstituted or substituted phenyl or cycloalkyl, or

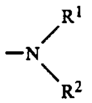

is pyrrolidinyl, piperidinyl or morpholinyl, $R^3$ is H or tert.-butyl, $R^4$ is H or methyl, $R^5$ is H, alkyl or phenalkyl and $R^6$ is H, alkyl, phenalkyl, cycloalkyl or unsubstituted or substituted phenyl, or

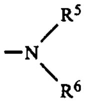

is pyrrolidinyl, piperidinyl or morpholinyl, possess improved lightfastness in pressure-sensitive recording systems.

7 Claims, No Drawings

MIXTURES OF DYE PRECURSORS, AND PRESSURE-SENSITIVE RECORDING MATERIAL CONTAINING THESE MIXTURES

Japanese Preliminary Published Application No. 124 930/1975 discloses the lactone of 2-carboxy-4,4'-bis-dimethylaminobenzhydrol (1). According to this published application, these lactones can be used as dye precursors in pressure-sensitive and heat-sensitive recording systems.

The known dye precursors, such as crystal violet lactone and the fluoran lactones, are very useful for pressure-sensitive and heat-sensitive recording systems but have the disadvantage of insufficient lightfastness in a number of applications.

It is an object of the present invention to provide dye precursors possessing improved lightfastness.

We have found that this object is achieved, and that dye precursors possessing improved lightfastness are obtained, if these are mixtures which essentially contain: (a) the lactone of 2-carboxy-4,4'-bisdimethylaminobenzhydrol (I) and (b) crystal violet lactone, one or more fluoran lactones of the formula (II)

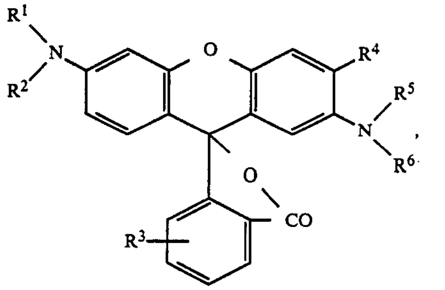

or a mixture of crystal violet lactone and one or more fluoran lactones, wherein, in the formula, $R^1$ is $C_1$-$C_4$-alkyl, $R^2$ is $C_1$-$C_4$-alkyl, $C_7$-$C_{10}$-phenalkyl, unsubstituted or $C_1$-$C_4$-alkyl-substituted phenyl or $C_5$- or $C_6$-cycloalkyl, or

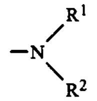

is pyrrolidinyl, piperidinyl or morpholinyl, $R^3$ is hydrogen or tert.-butyl, $R^4$ is hydrogen or methyl, $R^5$ is hydrogen, $C_1$-$C_4$-alkyl or $C_7$- or $C_8$-phenalkyl and $R^6$ is hydrogen, $C_1$-$C_{12}$-alkyl, $C_7$-$C_{10}$-phenalkyl or $C_5$- or $C_6$-cycloalkyl or is phenyl which is unsubstituted or substituted by chlorine, $C_1$-$C_4$-alkyl, methoxy, ethoxy, $C_1$- or $C_2$-alkylcarbonyl, benzoyl or phenoxy, or

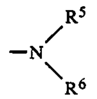

is pyrrolidinyl, piperidinyl or morpholinyl.

On CF layers based on active clays, the mixtures according to the invention give green, olive green or black colorations which possess greater lightfastness than those obtained using the dye precursors (II) alone.

Color production with (I) takes place only on CF layers which contain active clay. In the case of the novel mixtures, it is essentially (b) which first forms the picture. The picture of component (a) develops in the course of days in the presence of oxygen, a coloration possessing substantially improved lightfastness being produced. In the oxidation of (I), the lactone ring is probably retained.

The novel mixtures of dye precursors are therefore very useful for the preparation of pressure-sensitive recording systems.

Component (a) is of the formula (I)

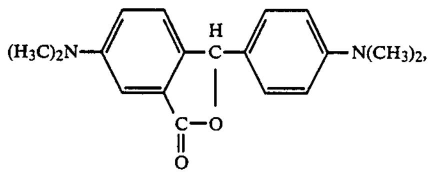

The preparation is described in Example 2 of Japanese Preliminary Published Application No. 124 930/1975.

Suitable components (b) are crystal violet lactone and/or fluoran lactones of the formula (II), of which the latter are preferred components (b).

In formula (II), $R^1$ and $R^2$ are each $C_1$-$C_4$-alkyl, such as methyl, ethyl, n- or isopropyl or n- or isobutyl, $R^2$ may furthermore by $C_7$- or $C_8$-phenalkyl, such as benzyl or phenylethyl, $C_5$- or $C_6$-cycloalkyl, such as cyclopentyl or cyclohexyl, or unsubstituted or substituted phenyl, such as phenyl, 2- or 4-methylphenyl,

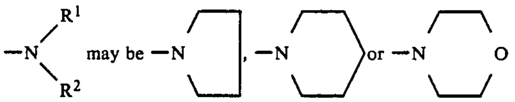

$R^3$ is hydrogen or tert.-butyl, $R^4$ is hydrogen or methyl, $R^5$ is hydrogen, $C_1$-$C_4$-alkyl, such as methyl, ethyl, propyl or n- or isobutyl, or $C_7$- or $C_8$-phenalkyl, such as benzyl or phenylethyl, $R^6$ is hydrogen, $C_1$-$C_{12}$-alkyl, such as methyl, ethyl, n- or isopropyl, n- or isobutyl, pentyl, n-hexyl, n-octyl, 2-ethylhex-1-yl, n-decyl or n-dodecyl, or $C_7$-$C_{10}$-phenalkyl, such as benzyl,, 1- or 2-phenylethyl, phenylpropyl or phenylbutyl, or is phenyl which is unsubstituted or substituted by $C_1$-$C_4$-alkyl, $C_1$-$C_4$-alkoxy, phenoxy,, benzoyl, acetyl, propionyl or chlorine, eg. phenyl, 2- or 4-methylphenyl, 4-n-butylphenyl, 4-isobutylphenyl, methoxphenyl, ethoxyphenyl, benzoylphenyl, phenoxyphenyl, acetylphenyl, propionylphenyl of 2-, 3- or 4-chlorophenyl, or is $C_5$- or $C_6$-cycloalkyl, such as cyclopentyl or cyclohexyl, and

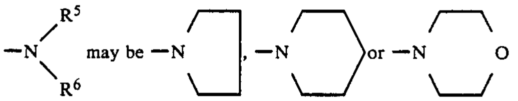

Preferred fluoran lactones of the formula (II) are those in which $R^1$ is methyl or ethyl, $R^2$ is methyl, ethyl, cyclohexyl, phenyl, 4-methylphenyl or benzyl, or

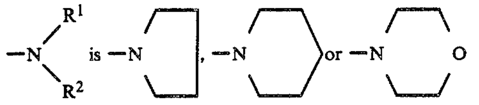

$R^3$ is hydrogen or tert.-butyl, $R^4$ is hydrogen or methyl, $R^5$ is hydrogen, benzyl or methyl, and $R^6$ is $C_1$–$C_{12}$-alkyl, in particular methyl, ethyl, n- or isopropyl, n-butyl, n-octyl or n-dodecyl, benzyl, phenyl, 2- or 4-methylphenyl, 4-butylphenyl or cyclohexyl, or

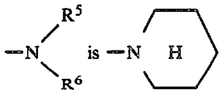

Particularly preferred compounds of the formula (II) are those in which $R^1$, $R^2$, $R^3$, $R^4$, $R^5$ and $R^6$ have the meanings stated in Table 1.

TABLE 1

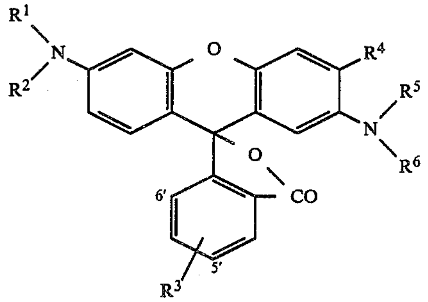

(II)

| Formula | $R^1$ | $R^2$ | $R^3$ | $R^4$ | $R^5$ | $R^6$ | disclosed in |
|---|---|---|---|---|---|---|---|
| 11.1 | $-CH_3$ | $-CH_3$ | —H | —H | —H | $-CH_3$ | DOS 1,671,545, dye precursor No. 1 |
| 11.2 | $-C_2H_5$ | $-C_2H_5$ | —H | —H | —H | $-CH_3$ | DOS 1.671,545, dye precursor No. 3 |
| 11.3 | $-C_2H_5$ | $-C_2H_5$ | —H | —H | —H | $-n\text{-}C_4H_9$ | DOS 1,671,545, Example 6 |
| 11.4 | $-C_2H_5$ | $-C_2H_5$ | —H | —H | —H | $-n\text{-}C_8H_{17}$ | DOS 2,422,899, Example 2 |
| 11.5 | $-C_2H_5$ | $-C_2H_5$ | —H | —H | —H | $-n\text{-}C_{12}H_{25}$ | DOS 2,422,899, Example 3 |
| 11.6 | $-C_2H_5$ | $-C_2H_5$ | —H | —H | —H | $-CH_2-C_6H_5$ | DOS 1,671,545, Example 8 |
| 11.7 | $-C_2H_5$ | $-C_2H_5$ | —H | —H | 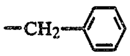 | 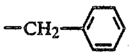 | DOS 2,130,845, Example 1 |
| 11.8 | $-C_2H_5$ | $-C_2H_5$ | —H | —H | —H |  | DOS 2,024,859, Example 1 |
| 11.9 | $-C_2H_5$ | $C_2H_5$ | —H | —H | $-CH_3$ | 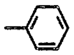 | DOS 2,155,987, FIG. 2 |
| 11.10 | $-C_2H_5$ | $-C_2H_5$ | —H | —H | $-CH_3$ | 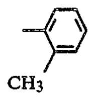 | DOS 2,130,846, Example 3 |
| 11.11 | $-C_2H_5$ | $-C_2H_5$ | —H | —H | $-CH_3$ | 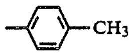 | DOS 2,130,846, Example 4 |
| 11.12 | $-(CH_2)_4$ | | —H | —H | —H | 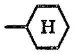 | DOS 2,424,935, Example 2 |
| 11.13 | $-(CH_2)_4-$ | | —H | —H | 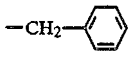 | 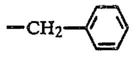 | DOS 2,130,845, Example 1 |
| 11.14 | $-(CH_2)_2-O-(CH_2)_2-$ | | —H | —H | —H | $-CH_3$ | DOS 2,424,935, Example 11 |
| 11.15 | $-(CH_2)_2-O-(CH_2)_2-$ | | —H | —H | —H | 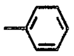 | GB-A 2 097 013, Example 5 |
| 11.16 | $-CH_3$ | 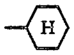 | —H | —H | $-(CH_2)_5-$ | | DOS 2,424,935, Example 22 |
| 11.17 | $-C_2H_5$ |  | —H | —H | $-CH_3$ | 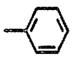 | DOS 2,262,127, Example 7 |

TABLE 1-continued (II)

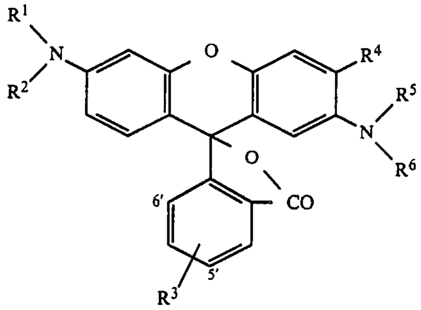

| Formula | $R^1$ | $R^2$ | $R^3$ | $R^4$ | $R^5$ | $R^6$ | disclosed in |
|---|---|---|---|---|---|---|---|
| 11.18 | $-CH_3$ | 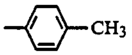 | $-H$ | $-H$ | $-CH_3$ | 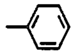 | DOS 2,262,127, Example 4 |
| 11.19 | $-C_2H_5$ | 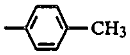 | $-H$ | $-H$ | 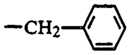 | 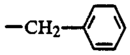 | DOS 2,262,127, Example 6 |
| 11.20 | $-C_2H_5$ | 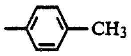 | $-H$ | $-H$ | $-CH_3$ | 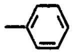 | DOS 2,262,127, Example 13 |
| 11.21 | $-CH_3$ | $-CH_3$ | $-H$ | $-CH_3$ | $-H$ | 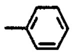 | DOS 2,202,315, Example 2 |
| 11.22 | $-C_2H_5$ | $-C_2H_5$ | $-H$ | $-CH_3$ | $-H$ | 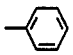 | DOS 2,155,997, Example 1 |
| 11.23 | $-C_2H_5$ | $-C_2H_5$ | $-H$ | $-CH_3$ | $-H$ | 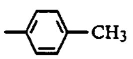 | DOS 2,202,315, Example 3 |
| 11.24 | $-C_2H_5$ | $-C_2H_5$ | $-H$ | $-CH_3$ | $-H$ | 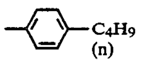 | DOS 3,114,968, Example 3 |
| 11.25 | $-CH_3$ | 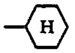 | $-H$ | $-CH_3$ | $-H$ | 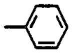 | DOS 2,424,935, Example 64 |
| 11.26 | $-CH_3$ | 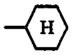 | $-H$ | $-CH_3$ | $-H$ | 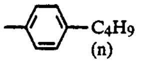 | DOS 2,424,935, Example 15 |
| 11.27 | $-(CH_2)_4-$ | | $-H$ | $-CH_3$ | $-H$ | 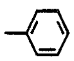 | DOS 2,424,935, Example 6 |
| 11.28 | $-(CH_2)_5-$ | | $-H$ | $-CH_3$ | $-H$ | 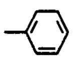 | DOS 2,424,935, Example 1 |
| 11.29 | $-CH_3$ | 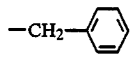 | $-H$ | $-CH_3$ | $-H$ | 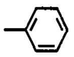 | Japanese Preliminary Publication 273/1977 |
| 11.30 | $-C_2H_5$ | $-C_2H_5$ | $-C(CH_3)_3$ | $-CH_3$ | $-H$ | 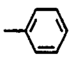 | P 33 37 387.6, Example 66 (DOS 3,337,387) |
| 11.31 | $-(CH_2)_4-$ | | $-C(CH_3)_3$ | $-CH_3$ | $-H$ | 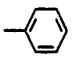 | P 33 37 387.6, Example 68 (DOS 3,337,387) |
| 11.32 | $-(CH)_2-O-(CH_2)_2-$ | | $-C(CH_3)_3$ | $-CH_3$ | $-H$ | 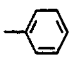 | P 33 37 387.6, Example 69 (DOS 3,337,387) |
| 11.33 | $-C_2H_5$ | $-C_2H_5$ | $-C(CH_3)_3$ | $-CH_3$ | $-H$ | 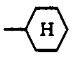 | P 33 37 387.6, Example 72 (DOS 3,337,387) |

TABLE 1-continued (II)

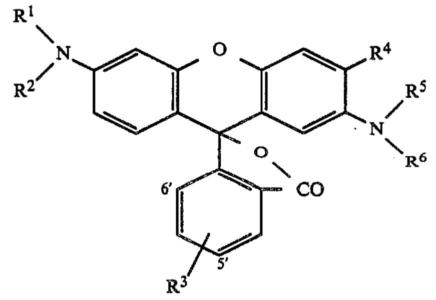

| Formula | $R^1$ | $R^2$ | $R^3$ | $R^4$ | $R^5$ | $R^6$ | disclosed in |
|---|---|---|---|---|---|---|---|
| 11.34 | $-(CH_2)_4-$ | | $-C(CH_3)_3$ | $-CH_3$ | $-H$ | 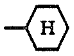 | P 33 37 387.6, Example 73 (DOS 3,337,387) |
| 11.35 | $-(CH_2)_2-O-(CH_2)_2-$ | | $-C(CH_3)_3$ | $-CH_3$ | $-H$ |  | P 33 37 387.6, Example 74 (DOS 3,337,387) |
| 11.36 | $-(CH_2)_2-O-(CH_2)_2-$ | | $-C(CH_3)_3$ | $-CH_3$ | $-H$ | $-CH(CH_3)_2$ | P 33 37 387.6, Example 75 (DOS 3,337,387) |
| 11.37 | $-C_2H_5$ | $-C_2H_5$ | $-C(CH_3)_3$ | $-H$ | $-H$ | 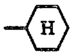 | P 33 37 387.6, Example 70 (DOS 3,337,387) |
| 11.38 | $-C_2H_5$ | $-C_2H_5$ | $-C(CH_3)_3$ | $-H$ | $-H$ | $-CH(CH_3)_2$ | P 33 37 387.6, Example 71 (DOS 3,337,387) |

The mixture contains the components (a) and (b) as a rule in a weight ratio of from 1:4 to 4:1, preferably from 1:3 to 3:1, in particular from 0.9:1.1 to 1.1:0.9, very particularly preferably about 1:1.

The novel mixture of dye precursors is preferably enclosed, in the form of a solution, in microcapsules, and used in this form for the production of pressure-sensitive transfer systems. The solvents used are those conventionally employed for the production of dye precursor-containing microcapsules, eg. chloroparaffins halogenated or partially hydrogenated diphenyl, partially hydrogenated terphenyl, alkylbenzenes, alkylnaphthalenes, alkylated dibenzylbenzene, liquid paraffin, mineral oil or solvents such as toluene or xylene. Suitable processes for the production of microcapsules are known, and reference may be made to U.S. Pat. Nos. 2,800,457 and 2,800,458, German Published Application DAS No. 2,119,933 and EP-A No. 26 914.

Suitable CF layers in conjunction with the novel mixtures of dye precursors are CF layers based on active clays. Such clays are commercially available, for example, under the name COPISIL ®.

The preparation of such papers containing active clay layers (CF papers) is known, and papers of this type are available commercially from a number of manufacturers. Some of the commercially available CF papers are listed below by way of example:

| Tradename | Company |
|---|---|
| IDEM ® | Wiggins Teape Ltd. |
| GIROFORM ® | Feldmuhle AG |
| GIROSET ® | Feldmuhle AG |
| SIGNAL ® | Carrs Paper Ltd. |
| CROXLEY Carbonless Copying Paper | Dickinson Robinson Group |
| TELECOPY ® plus | Dobbelin and Boder GmbH |

-continued

| Tradename | Company |
|---|---|
| KCC ® contact paper | Kores Burochemie AG |
| RC ® paper | Pelikan AG |

The examples which follow illustrate the invention. Parts and percentages are by weight.

EXAMPLE 1

(a) 0.5 part of a mixture of (I) and crystal violet lactone (III) in a weight ratio of 1:1 was kept in 99.5 parts of a chlorohydrocarbon (MEFLEX ®DC029 from J.CJ) for 1 hour at 100° C., a clear solution being formed.

(b) After cooling to room temperature, this solution was applied onto CF paper from Feldmühle AG (Giroform ®) using a 6 μm knife coater. The coated sheet was divided up. One half of the coated CF paper was exposed to diffuse day-light, while the other was stored in the dark.

(c) The intensity of the resulting coloration as a function of time was determined for both halves.

The intensity was determined using an ELREPHO apparatus from Leitz, Wetzlar. The K/S values were obtained from the values determined (tristimulus values) using the Kubelka-Munk equation. These K/S values, the quotient of the spectral absorption coefficient and the spectral scattering coefficient, are proportional to the color intensity and hence provide information about the intensity of colorations, even when these are not of the same hue.

(d) For comparison, the development of the color intensity of a 0.5% strength solution of (I) and of a 0.5% strength solution of crystal violet lactone (III) on the same CF paper was measured.

The K/S values determined are summarized in Table 2.

TABLE 2

| | K/S exposed | | | K/S unexposed | | |
|---|---|---|---|---|---|---|
| Dye precursor | immediately | 4d | 14d | immediately | 4d | 14d |
| (I) + (III) | 1.91 | 2.61 | 1.98 | 1.91 | 2.04 | 2.30 |
| (III) | 1.59 | 1.40 | 0.66 | 1.59 | 1.73 | 1.56 |
| (I) | 0.391 | 2.11 | 2.54 | 0.391 | 0.79 | 1.44 |

EXAMPLES 2 to 5

0.5% strength solutions of the mixtures of dye precursors stated in the Table below were prepared as described in Example 1(a). The dye precursor (b) is denoted by the No. of the formula in Table 1. For comparison, a solution of the individual dye precursors was also prepared in each case.

The solutions obtained were applied onto CF paper by means of a knife coater, as described in Example 1b), the coated sheets were halved and the development of the color intensity was determined as described in Example 1c).

The results are summarized in Table 3.

TABLE 3

| Example | Dye precursor | | exposed K/S immediately | 4d | 14d | unexposed K/S immediately | 4d | 14d |
|---|---|---|---|---|---|---|---|---|
| 2 | (I) + (II.13) | 1:1 | 0.54 | 1.3 | 1.55 | 0.54 | 0.81 | 1.29 |
| (comparison) | (II.13) | | 0.43 | 0.34 | 0.34 | 0.43 | 0.54 | 0.55 |
| 3 | (I) + (II.20) | 1:1 | 0.52 | 1.32 | 1.54 | 0.52 | 0.81 | 1.30 |
| | (III.20) | | 0.51 | 0.68 | 0.62 | 0.51 | 0.67 | 0.69 |
| 4 | (I) + (II.4) | 1:1 | 0.55 | 1.05 | 1.39 | 0.55 | 0.86 | 1.27 |
| (comparison) | (II.4) | | 0.51 | 0.49 | 0.23 | 0.51 | 0.61 | 0.60 |
| 5 | (I) + (II.25) | 1:1 | 0.60 | 1.26 | 1.71 | 0.60 | 1.03 | 1.46 |
| (comparison) | (II.25) | | 0.55 | 0.69 | 0.72 | 0.55 | 0.70 | 0.75 |
| (comparison) | (I) | | 0.39 | 2.11 | 2.54 | 0.39 | 0.79 | 1.44 |

We claim:

1. A mixture of dye precursors, containing essentially (a) the lactone of 2-carboxy-4,4'-bisdimethylaminobenzhydrol (I) and (b) crystal violet lactone, one or more fluoran lactones of the formula

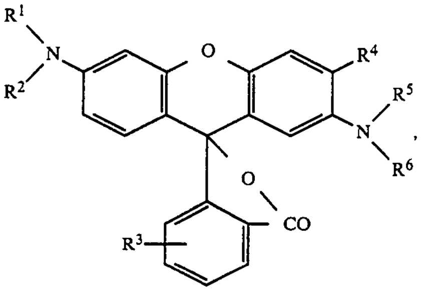

(II)

or a mixture of crystal violet lactone and one or more fluoran lactones, wherein, in the formula, $R^1$ is $C_1$–$C_4$-alkyl, $R^2$ is $C_1$–$C_4$-alkyl, $C_7$–$C_{10}$-phenalkyl, unsubstituted or $C_1$–$C_4$-alkyl-substituted phenyl or $C_5$- or $C_6$-cycloalkyl, or

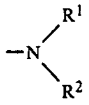

is pyrrolidinyl, piperidinyl or morpholinyl, $R^3$ is hydrogen or tert.-butyl, $R^4$ is hydrogen or methyl, $R^5$ is hydrogen, $C_1$–$C_4$-alkyl or $C_7$- or $C_8$-phenalkyl and $R^6$ is hydrogen, $C_1$–$C_{12}$-alkyl, $C_7$–$C_{10}$-phenalkyl or $C_5$- or $C_6$-cycloalkyl, or is phenyl which is unsubstituted or substituted by chlorine, $C_1$–$C_4$-alkyl, methoxy, ethoxy, $C_1$- or $C_2$-alkylcarbonyl, benzyl or phenoxy, or

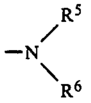

pyrrolidinyl, piperidinyl or morpholinyl.

2. A misture of dye precursors as claimed in claim 1, which in addition to (a) contains one or more fluoran lactones as (b).

3. A mixture of dye precursors as claimed in claim 1, wherein the weight ratio of (a) to (b) is from 1:4 to 4:1.

4. A mixture of dye precursors as claimed in claim 1, wherein the weight ratio of (a) to (b) is from 1:3 to 3:1.

5. A mixture of dye precursors as claimed in claim 2, wherein the weight ratio of (a) to (b) is from 1:4 to 4:1.

6. A mixture of dye precursors as claimed in claim 2, wherein the weight ratio of (a) to (b) is from 1:3 to 3:1.

7. A mixture of dye precursors as claimed in claim 2, wherein the weight ratio of (a) to (b) is from 0.9:1.1 to 1.1:0.9.

* * * * *